United States Patent [19]

Calcagno et al.

[11] 3,773,693

[45] Nov. 20, 1973

[54] METHOD OF PREPARING SUPPORTED OXIDATION CATALYSTS FOR PRODUCING ETHYLENE OXIDE

[75] Inventors: Benedetto Calcagno; Natale Ferlazzo, both of Milan; Marcello Ghirga, Bresso, all of Italy

[73] Assignee: Societa Italiana Resine S.I.R.S.p.A., Milan, Italy

[22] Filed: June 26, 1972

[21] Appl. No.: 266,115

Related U.S. Application Data

[63] Continuation of Ser. No. 877,493, Nov. 17, 1969, abandoned.

[30] Foreign Application Priority Data
Nov. 23, 1968 Italy .............................. 24089 A/68

[52] U.S. Cl............. 252/466 PT, 252/463, 252/476
[51] Int. Cl.............................................. B01j 11/12
[58] Field of Search .................... 252/463, 466 PT, 252/476

[56] References Cited
UNITED STATES PATENTS

| | | | |
|---|---|---|---|
| 2,424,083 | 7/1947 | Finch et al. | 252/476 X |
| 2,901,441 | 8/1959 | Waterman | 252/463 |

FOREIGN PATENTS OR APPLICATIONS

| | | | |
|---|---|---|---|
| 1,115,192 | 5/1968 | Great Britain | 252/476 |

*Primary Examiner*—Daniel E. Wyman
*Assistant Examiner*—W. J. Shine
*Attorney*—Henry J. Renk

[57] ABSTRACT

Ethylene oxidation catalysts are prepared by depositing silver oxide and metallic or oxide platinum, palladium or gold on an inert support, treating the support with specified organic acids such as lactic acid in aqueous solution and then heat treating.

7 Claims, No Drawings

METHOD OF PREPARING SUPPORTED OXIDATION CATALYSTS FOR PRODUCING ETHYLENE OXIDE

This is a continuation of application Ser. No. 877,493, filed Nov. 17, 1969, now abandoned.

The present invention relates to silver-containing catalysts supported on a base, for use in the preparation of ethylene oxide by the method whereby that compound is obtained by the high-temperature oxidation of ethylene in the presence of oxygen or an oxygen-containing gas.

As is well known, silver-containing supported catalysts can be obtained by the direct deposition of a coating of the catalytically active metal on an inert support.

Another method of depositing the active metal involves the impregnation of the support with a decomposable compound of the metal, which is then caused to decompose within the support.

Such catalysts, however, are not entirely satisfactory for the process in which ethylene is oxidised to form the corresponding oxide, especially as regards the characteristics of activity and selectivity.

Another difficulty that may be encountered in the methods used hitherto is the poor adhesion of the catalytic metal to the face of the support. In other words, the mechanical properties of the catalysts are not very high.

One object of the present invention is to obtain a catalyst consisting essentially of silver deposited on an inert support, which is highly active and selective in the process of oxidising ethylene to form ethylene oxide and possesses mechanical properties such that it can be utilised in industrial processes.

The method here proposed for the preparation of the catalyst consists essentially in applying treatment with an aqueous solution containing one or more organic acids, taken from the group consisting of acetic acid, tartaric acid, lactic acid, citric acid, malic acid and isomalic acid, to a solid, inert, subdivided support, on which have already been deposited silver oxide and at least one metal or metal oxide taken from the group containing the metals platinum, palladium and gold, and in applying high-temperature treatment to the product so obtained.

The preparation of the catalyst here proposed may be described more particularly as a process consisting of the following three successive stages:

impregnation of the particles of the support with an aqueous suspension of silver oxide and at least one metal or metal oxide taken from the group containing the metals platinum, palladium and gold, followed by the drying of the impregnated particles in specified temperature conditions;

impregnation of the dried particles with an aqueous solution containing one or more organic acids taken from the group consisting of acetic acid, tartaric acid, lactic acid, citric acid, malic acid and isomalic acid and possible also the silver salt of one or more of those acids, followed by the drying of the particles in controlled temperature conditions;

heat treatment of the particles, up to a maximum temperature of 230°C. to 360°C.

The catalysts with which this invention is concerned have a content of silver, calculated as metal, of 7 to 30 percent by weight in relation to the support, while the content of platinum, gold or palladium metal may vary from 0.01 to 1.0 percent by weight with respect to the metallic silver.

Materials that can be used for the support include alumina, silicon carbide, magnesium oxide or combinations of those substances, especially in the form of spheres having a diameter of 4 mm. to 9 mm.

One substance that is particularly advantageous for the purpose is alpha alumina that has been activated by treatment at a temperature above 1,000°C. and has a surface area of from 0.01 to 1.0 sq.m./g. and a porosity of 10 to 40 percent, with pores having a mean diameter of between 30 and 150 microns.

For the purposes of the invention, the inert, subdivided support is impregnated with an aqueous suspension containing the metals and/or oxides already specified, this being done at or slightly above ambient temperature. Temperatures of between 15°C. and 40°C. are suitable for this purpose.

In the first stage of the process, the amount of silver oxide used is not less than 70 percent of that required to produce in the final catalyst a content of metallic silver lying within the limits already mentioned, any balance being made up in the form of salts of the organic acids in the second stage of the process.

The particles thus impregnated are then subjected to drying, the temperature being raised gradually to a level not exceeding 130°C. and the particles being preferably kept in motion throughout.

In the second stage, the dried particles obtained during the first stage are impregnated with an aqueous solution containing one or more organic acids taken from the group consisting of acetic acid, tartaric acid, lactic acid, citric acid, malic acid and isomalic acid, in addition to whatever silver salts of those acids may be used, this being carried out at a temperature of between 60°C. and 100°C.

In this stage, the amount of acid used is such as to ensure that the ratio between the number of carboxyl groups free and salified and the total number of silver atoms used lies between 1:2 and 1:10.

Finally, drying is carried out with the temperature maintained between 60°C. and 130°C. and the pressure at or below atmospheric pressure.

The second stage of the process can conveniently be carried out in a rotary evaporator and it is also as well to add to the aqueous acid solution small quantities of an oxidising compound such as, for example, hydrogen peroxide or peroxy-acetic acid.

Finally, the particles obtained during the second stage are subjected to heat treatment at temperatures rising to a maximum of between 230°C. and 360°C. over periods of from 15 to 48 hours.

The catalysts so obtained are highly active and selective in the oxidation of ethylene to the corresponding oxide.

Thus, for example, in processes in which the initial gas consists of ethylene and oxygen diluted with inert gases, ethylene conversion of 25 to 40 percent are obtainable with yields of 70 percent or more of ethylene oxide.

The catalysts with which this invention is concerned have proved particularly suitable, moreover, for the production of ethylene oxide by the oxidation of ethylene in vapour phase, described in previous patent application Ser. No. 804,540, filed Mar. 5, 1969, by the present applicants and now abandoned, the method in which consists substantially in feeding into the reaction chamber ethylene and oxygen, substantially pure, separately or mixed together, in such a way that the amount of ethylene in the gas at entry is over 86 percent by volume.

The process in question is carried out at temperatures of 150°C. to 450°C. and pressures between 1 atmosphere and 30 atmospheres, with contact periods of 1 second to 10 seconds.

The selectivity obtained in those conditions likewise has been 70 percent, and generally higher, with respect to the ethylene converted.

Finally, the catalysts here proposed, which are prepared simply and economically, possess sufficiently high mechanical properties to enable them to be used commercially over long periods. In fact, these catalysts have been shown by abrasion tests to be as strong mechanically as the materials used for the support.

The following experimental examples will serve to illustrate the invention further.

EXAMPLE 1

For this experiment, use was made of alpha alumina in the form of spheres having a diameter of about 4 mm., activated by heating to over 1,000°C. and having a surface area of less than 1 sq.m./g.

Of these spheres, 55 g. were impregnated at ambient temperature with a suspension containing 8.5 g. of silver oxide and 17 mg. of platinum oxide in 15 g. of water.

The spheres thus impregnated were gradually heated, agitation being maintained, a temperature of 120°C. being attained in one hour. After drying, the total weight of the spheres was 63.05 g.

Then the dried product was placed in a rotary evaporator maintained at a temperature of 90°C. and was impregnated with a solution containing 9.0 g. of water and 2.5 g. of lactic acid (80 percent strength), to which were also added 0.2 g. of hydrogen peroxide and 1.5 g. of silver oxide.

This solution was heated to 70°C. prior to impregnation. The pressure was then reduced to 140 mm. Hg and during evaporation the temperature was maintained at between 62°C. and 90°C. for about 10 hours.

The spheres were then put into an oven at 90°C. and and temperature was raised to 130°C. over a period of 12 hours.

Finally, the catalyst was placed in a muffle furnace and the temperature was raised gradually to 230°C. in 8 hours, treatment being completed by keeping the spheres at 280°C. for 2 hours.

The finished catalyst had a silver content of 12.65 percent by weight, while the amount of platinum was equal to 0.15 percent by weight in relation to the metallic silver.

The surface area was between 0.1 and 0.2 sq.m./g.

EXAMPLE 2

Of the catalyst prepared as described in Example 1, 16 g. was placed in a steel reaction vessel having an inside diameter of 7.8 mm.

A gas mixture containing 7.7 percent by volume of oxygen and 6.6 percent by volume of ethylene, the remainder consisting of nitrogen, was fed into the reaction vessel at 20 litres N. per hour.

An addition of 3 p.p.m. of dichloro-ethane was made to the gas mixture.

Operating at ambient pressure and at a temperature of 295°C., the effective contact period being 1.6 seconds, 35 percent of the ethylene put in was converted to give a yield of 73 percent of ethylene oxide.

EXAMPLE 3

The same procedure was followed as in Example 1, except that the lactic acid was entirely replaced by the equivalent amount of acetic acid and all the silver was added during the first stage in the form of oxide in the impregnation of the support.

The catalyst obtained had a silver content of 12.5 percent by weight, while the amount of platinum was equivalent to 0.15 percent by weight in relation to the metallic silver.

EXAMPLE 4

The experiment in Example 2 was repeated, using 16 g. of the catalyst obtained in Example 3. The ethylene conversion was 36 percent, giving a 70 percent selectivity in ethylene oxide.

EXAMPLE 5

The same procedure was followed as in Example 1, save only that the lactic acid was entirely replaced by the equivalent amount of tartaric acid.

The catalyst obtained had a silver content of 13 percent by weight and a platinum content of 0.15 percent by weight in relation to the metallic silver.

EXAMPLE 6

The experiment in Example 2 was repeated, using 16 g. of the catalyst obtained in Example 5. Of the ethylene put in, 25 percent was converted with 70 percent selectivity into ethylene oxde.

What we claim is:

1. A process for preparing silver supported catalysts, said catalyst consisting essentially of from about 7 to about 30 percent by weight silver, calculated as metal, based on the weight of the support and from about 0.01 to about 1.0 percent by weight, based on the weight of metallic silver, of at least one metal selected from the group consisting of platinum, palladium and gold, said process consisting essentially of:

a. providing a support which consists essentially of alpha-alumina having a surface area of from about 0.01 to about 1.0 m$^2$/g, a porosity of from about 10 to about 40 percent and an average pore diameter of from about 30 to about 150 microns;

b. impregnating said support at a temperature of from about 15 to about 40° C with an aqueous suspension of silver oxide and at least one member selected from the group consisting of platinum metal, palladium metal, gold metal and oxides thereof, wherein the amount of silver oxide in said aqueous suspension is sufficient to provide at least 70 percent of the desired content of silver in said catalyst;

c. drying the resulting impreganted support by gradually raising the temperature of said impreganting support to a temperature not exceeding about 130°C;

d. impregnating the resulting particles at a temperature of from about 60 to about 100° C with an aqueous solution consisting essentially of at least one organic acid selected from the group consisting of lactic acid, acetic acid, tartaric acid, citric acid, malic acid and isomalic acid, the amount of said organic acid in said aqueous solution being sufficient to provide a ratio of the number of free and salified carboxyl groups to the number of silver atoms of from about 1:2 to about 1:10;

e. drying the resulting particles at a temperature of from about 60 to about 130° C at atmospheric or reduced pressure; and f. heat-treating the resulting particles by gradually raising the temperature of said particles to from about 230 to about 360° C for a period of time of from about 15 to about 48 hours.

2. The process of claim 1 wherein the aqueous solution employed in step (d) also contains a silver salt of said organic acid in an amount, together with the amount of silver provided by the impregnation with silver oxide in step (b), sufficient to provide a catalyst having from about 7 to about 30 percent by weight silver, calculated as metal, based on the weight of the support.

3. The process of claim 1 wherein during step (C), the impregnated support particles are kept in motion.

4. The process of claim 1 wherein said alpha-alumina is in the form of spheres having a diameter of from about 4 to about 9 millimeters.

5. The process of claim 1 wherein said aqueous solution employed in step (d) also contains small quantities of an oxidizing compound selected from the group consisting of hydrogen peroxide and peroxy-acetic acid.

6. The process of claim 1 wherein said step (e) is conducted at a temperature of from about 62 to about 90° C at a pressure of about 140 millimeters of mercury for a period of time of about 10 hours, followed by heating at a temperature of from about 90° to about 130° C for a period of time of about 12 hours.

7. Catalyst prepared by a method as in claim 1.

* * * * *